United States Patent [19]

Rundell

[11] 4,364,277

[45] Dec. 21, 1982

[54] SENSITIVE HEAVY DUTY DYNAMIC TORQUE MEASUREMENT COUPLING UNIT AND METER

[75] Inventor: Herbert A. Rundell, Houston, Tex.

[73] Assignee: Texaco Inc., White Plains, N.Y.

[21] Appl. No.: 209,163

[22] Filed: Nov. 21, 1980

[51] Int. Cl.$^3$ ............................................. G01L 3/14
[52] U.S. Cl. ............................ 73/862.34; 73/862.32; 464/81
[58] Field of Search ........... 73/862.32, 862.33, 862.34, 73/862.35; 64/15 R, 15 B, 27 R, 27 B, 27 L

[56] References Cited

U.S. PATENT DOCUMENTS

| | | | |
|---|---|---|---|
| 1,214,307 | 1/1917 | Hosford | 64/15 B |
| 1,369,349 | 2/1921 | Murphy | 64/15 B |
| 1,935,730 | 11/1933 | Smith | 64/15 B |
| 2,592,796 | 4/1952 | Doussain | 73/862.33 |
| 2,907,563 | 10/1959 | Verde et al. | 64/15 R X |
| 3,128,622 | 4/1964 | LeBow | 73/862.35 |
| 3,611,750 | 10/1971 | Gasior | 64/15 R |
| 3,823,607 | 7/1974 | Rundell | 73/862.34 |
| 4,186,596 | 2/1980 | Böhringer et al. | 73/862.35 |

*Primary Examiner*—Charles A. Ruehl
*Attorney, Agent, or Firm*—Carl G. Ries; Robert A. Kulason; Henry C. Dearborn

[57] ABSTRACT

A sensitive and compact heavy duty torque coupler. It includes elements of a dynamic torque meter. There are deflection elements to permit angular displacement under load, and they include radially situated legs that bend under load. The legs are connected at one end by an axially situated, integrally formed member that twists under load. There are a plurality of the deflection elements forming an annular torque transmitting unit. And, there is a stationary housing for the torque meter.

8 Claims, 4 Drawing Figures

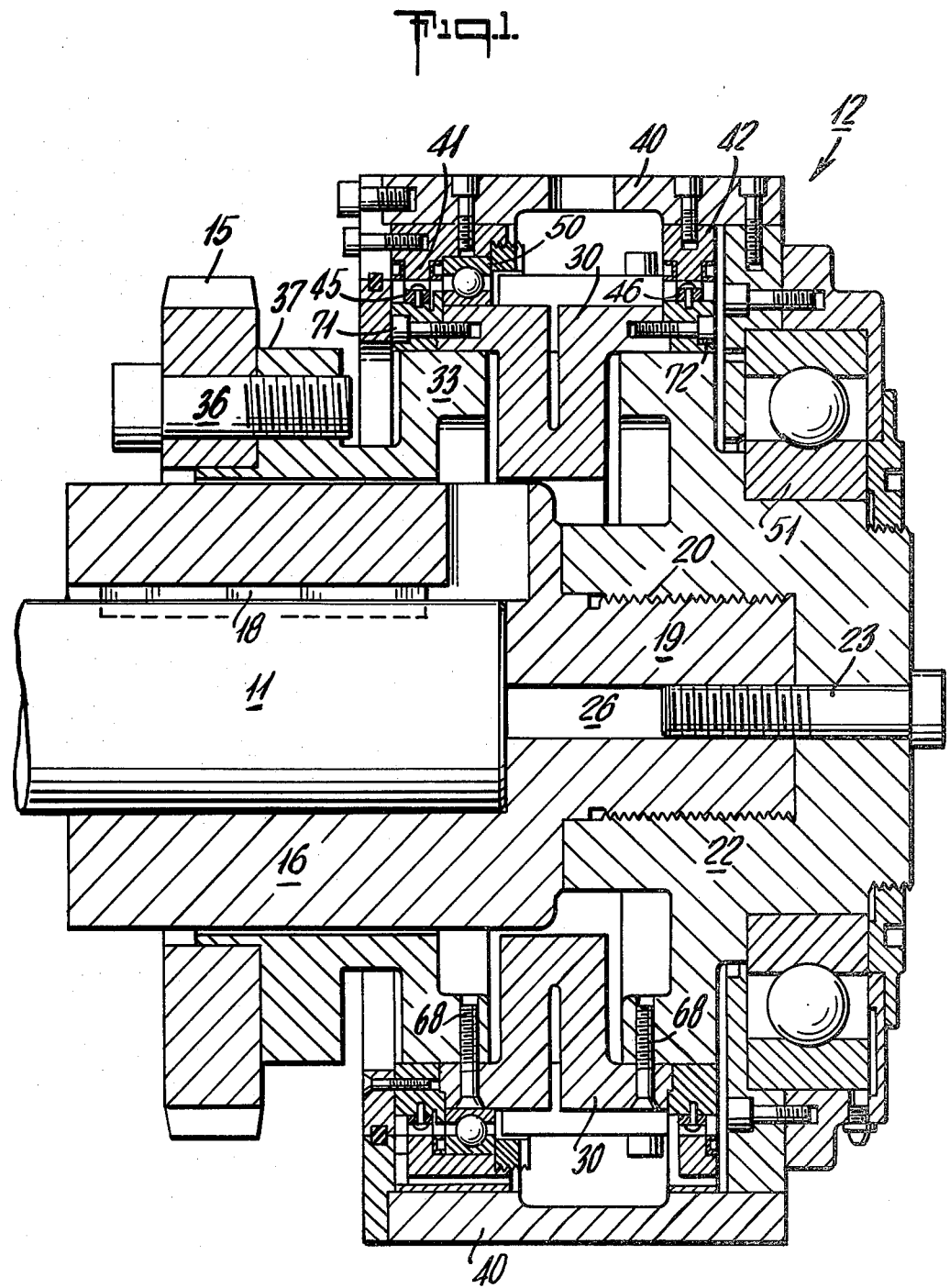

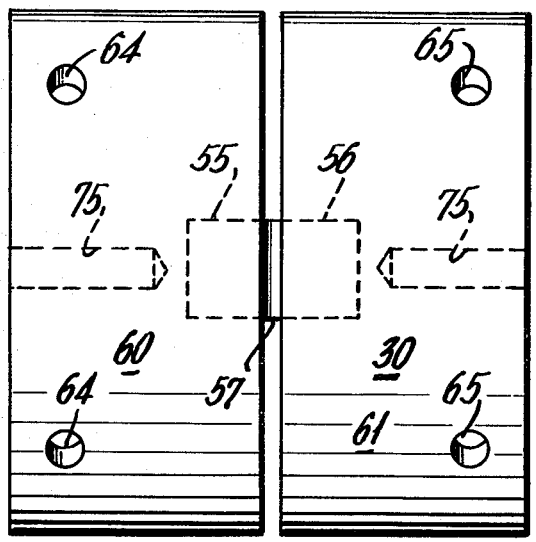
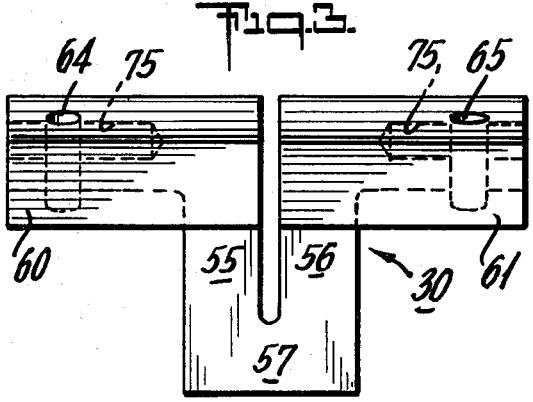
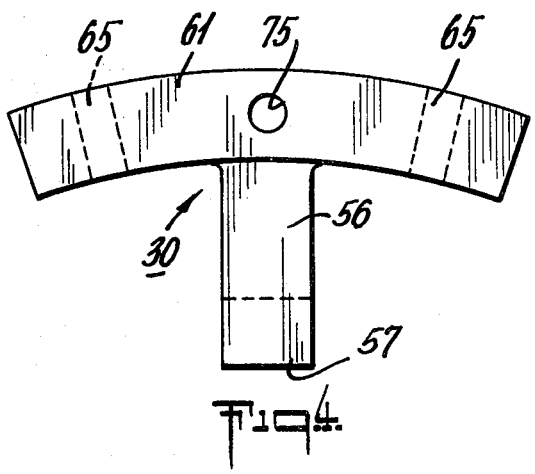

SENSITIVE HEAVY DUTY DYNAMIC TORQUE MEASUREMENT COUPLING UNIT AND METER

BACKGROUND OF THE INVENTION

1. Field of the Invention

This invention deals with dynamic torque meters, in general. More specifically, it concerns a sensitive heavy duty dynamic torque measurement coupling unit that is particularly applicable to and may include elements of a dynamic torque meter.

2. Description of Prior Art

In the past a sensitive torque meter has been developed which was in accordance with that shown and described in U.S. Pat. No. 3,295,367 issued Jan. 3, 1967. Thereafter, the principles of my torque meter were applied to a series of heavy duty torque coupling structures which are shown and described in a series of three patents, i.e. U.S. Pat. Nos. 3,599,482 issued Aug. 17, 1971; 3,823,607 issued July 16, 1974; and 4,085,612 issued Apr. 25, 1978. In addition, there is an extra heavy duty torque meter and coupling structure shown and described in a copending application, Ser. No. 108,869 filed Dec. 31, 1979, now U.S. Pat. No. 4,275,588 which employs a structure for accommodating extremely high torque loads.

It is an object of this invention to provide a highly compact and relatively sensitive heavy duty torque coupler structure which accommodates a dynamic torque meter of the type embodied by my above noted patents, such that a superior dynamic torque meter and coupler results.

SUMMARY OF THE INVENTION

Briefly, the invention concerns a sensitive heavy duty dynamic torque measurement coupling unit that is for use in oil well drilling and the like. It comprises in combination an annular torque transmitting unit which comprises a plurality of deflection elements for permitting relative angular displacement under load. The deflection elements comprise radial means for bending under the load, and axial means for connecting the said radial means at one end thereof.

Again briefly, the invention concerns sensitive heavy duty dynamic torque measurement coupling unit for use in oil well drilling and the like. It comprises in combination an annular torque transmitting unit for coupling a shaft to a load. The said unit comprises a plurality of deflection elements mounted peripherally on said unit. Each said deflection element comprises a pair of parallel legs having rectangular cross-sectional shape and an integral connecting member having rectangular cross-sectional shape, both forming a U-shaped structure. Each said deflection element also comprises a circular segment integral with the free end of each of said parallel legs and located at the end opposite said connecting member. The said deflection elements are mounted on said unit with said U-shaped structure reentrant relative to the axis of said coupling unit. All of the elements cooperate so that said deflection element legs are located radially relative to said coupling unit and said connecting members are located axially relative to said coupling unit, in order that the said legs flex by bending under load while the said connecting members flex by twisting.

Once more briefly, the invention concerns a sensitive heavy duty dynamic torque meter for use in oil well drilling and the like. It comprises in combination an annular torque transmitting unit comprising a plurality of deflection elements for permitting relative angular displacement under load. The said deflection elements comprise a pair of radial parallel legs having rectangular cross-sectional shapes for bending under said load, and an axial rectangular cross-sectional shaped connecting member integral with one end of said parallel legs to form a U-shaped structure. The said connecting member twists under said load. And, the deflection elements comprise circular segments integrally attached to the free ends of said U-shaped structure for attaching them to said torque transmitting unit. The said deflection elements are mounted with said U-shaped structure reentrant relative to the axis of said torque transmitting unit. The combination also comprises a stationary housing for said torque meter, and means for dynamically measuring said angular displacement comprising a pair of rotors and stators. The dynamic measuring means also comprises means for attaching one of said rotors to said circular segments at one of said free ends, and means for attaching the other of said rotors to said circular segments at the other of said free ends. And, the dynamic means comprises means for attaching said stators to said housing.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a longitudinal cross section showing a torque measurement coupling unit with torque meter elements, according to the invention;

FIG. 2 is an enlarged top plan view of one of the plural deflection elements that are incorporated in the coupling unit;

FIG. 3 is a side elevation of the deflection element illustrated in FIG. 2; and

FIG. 4 is an end elevation of the deflection element illustrated in FIG. 2.

DESCRIPTION OF THE PREFERRED EMBODIMENT

Referring to the drawing figures and particularly with reference to FIG. 1, it will be observed that there is a torque transmitting shaft 11 to which a torque measurement coupling unit 12 (according to this invention) is attached. In the particular unit 12 that is illustrated, the torque load is transmitted to or from the shaft 11 via the unit 12 which connects it to a gear 15. The gear 15 is for accommodating a chain (not shown) or for making some other type of lateral coupling with the load. It will be understood that the load being transmitted may be positive or negative and in either direction, i.e. from the shaft 11 to the gear 15 or in reverse.

The coupling between shaft 11 and the gear 15 is carried out by the various elements of the unit 12 which include a socket member 16 that is securely attached onto the end of the shaft 11 for positive rotation therewith at all times. Such attachment may be carried out by any feasible means such as by use of a key 18 to ensure the positive no-slip attachment.

The socket 16 has a hub 19 for attaching a flange 22 onto the hub 19. The attachment is made by having a threaded connection 20, as well as by including a bolt 23 the threads into an axially located hole 26 through the hub 19.

The flange 22 transmits torque load from the shaft 11 via the socket 16 and hub 19 to a plurality of deflection elements 30, one of which is illustrated enlarged and in more detail in FIGS. 2, 3 and 4. There are a plurality of these deflection elements 30 that form an annular structure around the periphery of the flange 22. It may be noted that one side of each of the deflection elements is mounted firmly against the outer surface of the flange 22, while the other side of each is mounted on another flange 33. Flange 33 is designed to accommodate and have mounted securely thereon, the gear 15. Thus, there are a plurality of bolts 36 that go through the gear 15 and attach to a radial extension 37 of the flange 33 in order to provide positive rotation therewith at all times.

There is a housing 40 that is stationary and supports a pair of stators 41 and 42. These stators 41 and 42 are elements of a torque meter which is like that shown and described in the above noted U.S. patents. The stators act in cooperation with a pair of corresponding rotors 45 and 46, respectively. Rotors 45 and 46 are in turn mounted on the two flanges 33 and 22, respectively, so that they rotate in a fixed manner with the flanges at either end of the deflection elements 30.

The housing 40 is stationary and is mounted on bearings 50 and 51. These have the inner bearing races mounted to rotate with the respective flanges 33 and 22. It may be noted that the deflection elements 30 permit relative angular displacement of the rotors 45 and 46 as load isapplied through the coupling unit 12.

An important feature of this invention is the structure of the deflection elements 30. It permits a substantial improvement in sensitivity while still accommodating a heavy duty torque load. With particular reference to FIGS. 2, 3 and 4, it will be observed that the deflection elements 30 each include a pair of radially situated (as mounted on coupling unit 12) parallel legs 55 and 56. These have rectangular cross section shape, and they are connected at one end by an integral member 57 that is axially situated (as mounted on unit 12) and that forms a U-shaped structure. This is most readily apparent from FIG. 1 and FIG. 3.

The free ends of the legs 55 and 56 of a deflection element 30 are integrally attached into circular segments 60 and 61 that are designed for attaching the deflection elements 30 to the respective flanges 33 and 22 of the coupling unit 12. Such attachment may be done in any feasible manner such as that illustrated. There are a pair of holes 64 in the segment 60, and similarly another pair of holes 65 in the segment 61. These holes accommodate bolts 68 when the deflection elements 30 are mounted on the coupling unit 12, as shown in FIG. 1. The rotors 45 and 46 are attached to the segments 60 and 61 by use of bolts 71 and 72. These bolts screw into holes in the edges of the segments, e.g. there is a hole 75 that is illustrated in FIGS. 2 and 4.

It will be noted that the deflection elements 30 are mounted with the U-shaped structure that is formed by legs 55, 56 and connecting member 57, in a reentrant attitude relative to the axis of the entire unit 12. This adds to the compactness of the entire coupling unit and permits easy mounting of the dynamic torque measuring elements.

It will be appreciated that a coupling unit according to this invention could be adapted for providing torque from the shaft 11 to another coaxially extending shaft (not shown). With that arrangement, the torque being measured would be the torque transmitted from one shaft to another along the same line. However, in the preferred embodiment that is illustrated and described, the benefits of transmitting from a shaft to a lateral chain or gear connection or vice versa, via a gear such as the gear 15, is accomplished.

While a particular embodiment according to the invention has been described above in considerable detail in accordance with the applicable statutes, this is not to be taken as in any way limiting the invention but merely as being descriptive thereof.

I claim:

1. A sensitive heavy duty dynamic torque measuring coupling unit for use in oil well drilling and the like, comprising
    an annular torque transmitting unit,
    said torque transmitting unit comprising (1) a pair of annular driving and driven torque transmitting means, and (2) a plurality of deflection elements for permitting relative angular displacement of said driving and driven torque transmitting means under load,
    said deflection elements each comprising (a) a pair of radial parallel legs having rectangular cross-sectional shapes for bending under said load, (b) an axial integral connecting member forming a U-shaped structure and having rectangular cross-sectional shape for twisting under said load, and (c) circular segments integrally attached to the free ends of said U-shaped structure for attaching said deflection elements to said driving and driven torque transmitting means.

2. Coupling unit according to claim 1, wherein
    said deflection elements are mounted with said U-shaped structure reentrant relative to the axis of said coupling unit.

3. A sensitive heavy duty dynamic torque measurement coupling unit for use in oil well drilling and the like, comprising
    an annular torque transmitting unit for coupling a shaft to a load,
    said torque transmitting unit comprising (1) a pair of annular driving and driven torque transmitting means, and (2) a plurality of deflection elements mounted peripherally on said torque transmitting means,
    each said deflection element comprising a pair of parallel legs having rectangular cross-sectional shape and an integral connecting member having rectangular cross-sectional shape both forming a U-shaped structure,
    each said deflection element also comprising a circular segment integral with the free end of each of said parallel legs opposite said connecting member,
    said deflection elements being mounted on said unit with said U-shaped structure reentrant relative to the axis of said coupling unit,
    all whereby said deflection element legs are located radially relative to said coupling unit and said connecting members are located axially relative to said coupling unit so that said legs flex by bending under load while said connecting members flex by twisting.

4. Sensitive heavy duty dynamic torque meter for use in oil well drilling and the like, comprising in combination
    an annular torque transmitting unit comprising (1) a pair of annular driving and driven torque transmitting means, and (2) a plurality of deflection elements for permitting relative angular displacement of said driving and driven torque transmitting means under load, and means for dynamically measuring said angular displacement, said deflection elements each comprising (a) a pair of radial parallel legs having rectangular cross-sectional shapes for bending under said load, (b) an axial integral connecting member forming a U-shaped structure and having rectangular cross sectional shape for twisting under said load, and (c) circular segments integrally attached to the free ends of said U-shaped structure for attaching said deflection elements to said driving and driven torque transmitting means.

5. Torque meter according to claim 4, wherein said deflection elements are mounted with said U-shaped structure reentrant relative to the axis of said torque transmitting unit.

6. Torque meter according to claim 5, wherein said means for dynamically measuring said angular displacement comprises a pair of rotors and stators, and wherein said combination also comprises a stationary housing.

7. Torque meter according to claim 6, wherein said combination also comprises means for attaching one of said rotors to said circular segments at one of said free ends, means for attaching the other of said rotors to said circular segments at the other of said free ends, and means for attaching said stators to said housing.

8. Sensitive heavy duty dynamic torque meter for use in oil well drilling and the like, comprising in combination an annular torque transitting unit comprising (1) a pair of annular torque transmitting means, and (2) a plurality of deflection elements for permitting relative angular displacement of said torque transmitting means under load, said deflection elements comprising a pair of radial parallel legs having rectangular cross-sectional shaped for bending under said load, an axial rectangular cross-sectional shaped connecting member integral with one end of said parallel legs to form a U-shaped structure, said connecting member twisting under said load, and circular segments integrally attached to the free ends of said U-shaped structure for attaching to said torque transmitting means, said deflection elements being mounted with said U-shaped structure reentrant relative to the axis of said torque transmitting unit, a stationary housing for said torque meter, and means for dynamically measuring said angular displacement comprising a pair of rotors and stators, means for attaching one of said rotors to said circular segments at one of said free ends, means for attaching the other of said rotors to said circular segments at the other of said free ends, and means for attaching said stators to said housing.

* * * * *